INVENTORS
MERRILL A. YOUNG
DAVID N. ERLENBACH
By George M. Soule
ATTORNEY

3,050,979
IMPACT TESTING

Merrill A. Young, Gates Mills, and David N. Erlenbach, Lakewood, Ohio, assignors to Curtiss-Wright Corporation, a corporation of Delaware
Filed Aug. 15, 1960, Ser. No. 49,729
7 Claims. (Cl. 73—1)

The present invention relates to an improved method and instrument or apparatus for testing the essential operational characteristics and/or the materials, designs, etc. used in the construction of rotary impact-producing tools, particularly wrenches, thus indicating the principal object thereof.

A specific object is to provide a simple and practicable method and apparatus for comparing the effective torque-producing operations of a number of combinations of cooperating ratchet components in a manual impact wrench, particularly of a kind or type described below.

Figure 1:
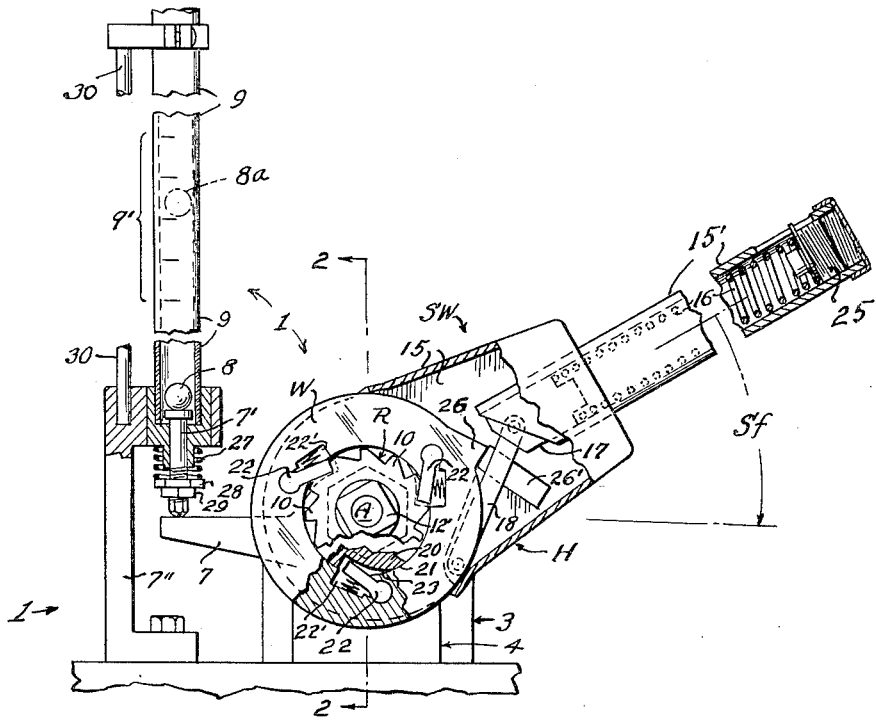
Figure 2:
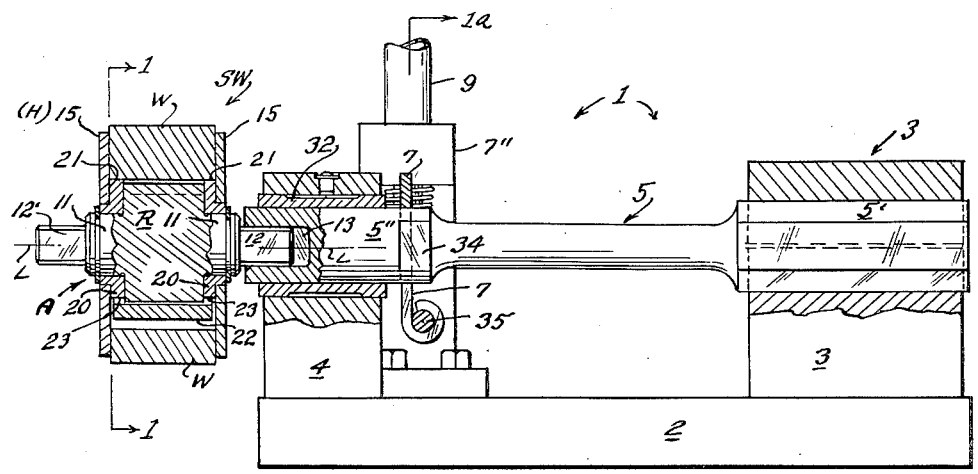

Other objects and novel features of the invention will become apparent from the following description of a suitable embodiment thereof as shown in the accompanying drawing, wherein:

FIGS. 1 and 2 are mutually complementary views, partly in cross section as conventionally indicated, showing a preferred form of test or inspection fixture and a manual rotary impact wrench in testing or inspecting position in respect to the fixture.

As shown in FIGS. 1 and 2 the impact wrench assembly SW is in testing position in reference to test fixture unit 1, comprising a base 2, pillow block or vise assembly 3, bearing assembly 4 and "elastic" torsion bar 5 preferably of metal such as steel. The pillow block or vise 3 is suitably designed to clamp an end portion 5' (e.g. hexagonal in cross section) of the torsion bar 5 against angular movement about the longitudinal axis of the bar while allowing an opposite, e.g. cylindrical free end portion 5" to turn as in bearing assembly 4 when subjected to torsional impact by an output member of the tool to be tested or inspected. An arm 7 is rigid with an intermediate portion or free end portion 5'" of the torsion bar, and the arm (via a suitable tappet or firing pin 7' on bracket 7" as shown) jolts and propels an object or projectile 8 (e.g. a hardened steel or other elastic ball) into association as at 8a with a suitable impact-comparing or measuring scale represented by a series of graduations 9' on a transparent vertical go-and-return guide such as a plastic tube 9. The head or top end of pin 7' is suitably smooth and hard. Various other details of the testing apparatus or fixture 1 will be described later.

The present invention provides a method of comparing output or delivery impacts of rotary impact tools, comprising torque-connecting the tools to an angularly movable end portion of a torsion bar which is held fast at its opposite end, and causing an intermediate portion of the torsion bar to jolt a projectile along a guide through distances approximately proportional to the impacts delivered to the torsion bar by the tools.

While the present invention is expected to be applicable to the testing and calibration of any tool capable of imparting torsional impacts to a rotary output member of the tool, it has a special significance as applied in the inspection or testing, including power spring calibration, of a manual rotary impact wrench such as disclosed by U.S. Patent No. 2,954,714, issued Oct. 4, 1960, to Oscar J. Swenson, entitled Manually Actuated Rotary Impact Tool.

The impact wrench SW as shown in FIGS. 1 and 2, includes a rotary tool head A having a central ratchet wheel portion R with equally spaced ratchet teeth 10; two cylindrical journal portions 11, and identical output stubs 12 and 12' integral therewith and of non-circular or polygonal form in cross section designed for torque transmitting engagement with adapters or standard sockets, not shown, for application to the work such as bolt heads or nuts threaded on the bolts. Torsion bar 5 of the present measuring or testing instrument unit 1 is suitably held fast by the pillow block or vise 3, thus serving, during testing of the impact tool SW, more or less as the work (nut or bolt head) would serve during normal operation of the tool SW. With that in view, and especially in order to avoid having to use an adapter (e.g. standard socket, not shown) between the output stubs 12 or 12' and the torsion bar 5, the bar 5, as shown in FIG. 1, has a non-circular, e.g., generally square, socket 13 mating with the stubs 12 or 12'. Thereby the necessary cantilever support for the tool SW is of desirably short length.

Incidentally, the tool SW can be applied to the unit 1 with either sub 12 or 12' interchangeably engaging the torsion bar socket 13. The indicator, ball 8, is propelled in the tube 9 approximately the same distance irrespective of the manner of application, hence independent of the direction of angular movement or rotation of the tool SW about the axis L of the torsion bar.

The tool head A is turnably journalled in and on a wrench input assembly H in annular cam-bushings 20 rigid therewith, said assembly H, as shown, being in the form of a box-like hollow body 15 having a tubular handle or hand hold extension 15' thereon containing and guiding an adjustable helical compression power spring 16. The power spring 16 is shown (FIG. 1) connected by a slidable crosshead 17 and link 18 to a rotor or flywheel W supported on external circular surfaces 21 (cf. FIGS. 1 and 2) of the cam bushings 20 for angular movement relative to the handle assembly and to the tool head about the tool head axis L.

The rotor W is connected to the tool head so as to impart a succession of powerful impacts thereto, via evenly spaced spring biased pawls 22 swingably mounted in recesses 22' in the rotor, one for each approximately 30° movement of the handle assembly (assuming there are twelve ratchet teeth 10).

As more fully explained in said patent, angular movement of the handle assembly H as in the arrow indicated or clockwise direction, FIG. 1, increases the energy in or compression of the power spring 16 so long as the pawls remain obstructed against easy angular movement (tool head R remaining stationary); but meanwhile each of three equally spaced cam surfaces 23 (FIG. 1) on the cam bushings 20 overlapped by end portions of the pawls 22 (see FIG. 2) force the pawls out of abutment with associated ratchet tooth faces, then allowing the stressed power spring 16 suddenly to turn the rotor W until its pawls 22 forcibly strike the next adjacent set of ratchet tooth faces. Stop abutments 26 and 26' on the rotor W and handle assembly H respectively are brought together during each impact by residual compression of the power spring 16 to establish a starting, FIG. 1-illustrated, relative position of the handle assembly and rotor. The rotor W has sufficient inertia so that the just described torsional impact operation of the tool SW is highly effectual in freeing "frozen" threaded fasteners and of course in tightening such fasteners to predetermined bolt tension values.

Since the rightward end of torsion bar 5 (FIG. 2) of testing unit 1 cannot turn about axis L relative to the stationary supports 2 and 3, a full 360° clockwise turn of the tool handle assembly H produces twelve impacts which should be uniform if the tool has been properly manufactured. The twelve impacts, via the heights of movement of ball 8, tests and compares all possible pawl and ratchet tooth combinations of tool SW. When the tool has three pawls and twelve ratchet teeth (as shown) each of the abutment stops or impact faces of the ratchet wheel R would receive one blow if the handle H were to be moved through four impact positions (i.e. through approximately 120°). In the testing of critical portions of the tool (e.g., representative abutment faces of ratchet teeth and pawls) or in running destructive or life tests on the tool SW (or other impact tools) the handle or input assembly of the tool may be oscillated as by a motor driven crank (not shown) through a fixed angular distance Sf (e.g. approximately 30° in case of tool SW) or whatever is necessary to produce successive tripping action as of the pawls 22 by the cam faces 23. In calibrating the power spring 16, via adjusting a nut 25, FIG. 1, in the handle 15' in reference to a suitable witness mark or set of graduations (not shown but located on the handle 15') any of the above described manners of operation of the impact tool SW in the present test unit 1 can be used.

Spring 27 of tappet 7' operates as will be evident from FIG. 1 to maintain the tappet in contact with the arm 7. Such spring 27 can be adjusted to absorb definite amounts of each normal impact as by provision of nuts 28 and 29 threaded on the stem of the tappet. Bracket assembly 30 provides a suitable stable support for graduated tube 9. Bearing sleeve 32 (FIG. 2) in assembly 4 supports cylindrical portion 5" of the torsion rod 5. Arm 7 can be secured to the torsion bar 5 against paired flats 34 (one shown) as by a clamp screw 35 in paired loop formations on the arm 7.

In the use of the above described testing or inspection apparatus 1, an important function, particularly when changes, as in design or size or use, of the impact tools are contemplated, is to determine or predict the ability of materials as of the rotor W, ratchet teeth and pawls, stops 26 and 27 and other parts to witstand expected shock and wear. Another is to compare the intensity of impact of typical or if desired, all possible combinations of abutment or impact-producing faces, thereby to enable correction to be made if some combinations are found less effectual than others. Incidentally, when roughness develops on either the ratchet tooth faces or the cooperating pawl ends a rather surprising reduction of impact force occurs in the tool, SW, evidently due to dissipation or partial absorption of impact forces by oil and other accumulations on the rough surfaces. It is, of course, extremely important to locate undesired friction points or regions as in association with cam bushings 20 and associated parts and to determine the effects of minor variations in power spring scale or dimensional variations or changes as in spring stock or guiding surfaces for parts associated with the power spring.

Further regarding the graduations 9' by reference to which an operator can easily make the hereinabove comparative tests (reactions to torque-developed impact) it is unnecessary that the graduations shall refer to any particular units of value.

The information made available by the signal device or indicator (ball 8) can of course be variously translated. For example, the ball 8 can trip switch elements mechanically or photoelectrically or in other ways, e.g., to emphasize critically important deficiencies of tools tested or to operate recorders such as cycle counters.

We claim:

1. An instrument for testing rotary impact tools, comprising an elongated torsion bar, means supporting one end portion only of the bar and holding that portion against angular movement about the longitudinal axis of the bar, means adapted demountably to connect the opposite end portion of the bar to an output or impact-delivering member of a tool to be tested, an abutment connected to the torsion bar so as be jolted in a predetermined direction when the free end portion of the bar is subjected to torsional impact by the tool, a projectile normally resting against the abutment, and a go-and-return guide along which the projectile is propelled in said direction by the jolting movement of the abutment.

2. The instrument according to claim 1, wherein the projectile is a hard spherical metal ball and the guide is a vertically disposed tube having a wall portion through which the ball can be seen as projected to various heights.

3. The instrument according to claim 2, wherein the tube comprises a material capable of being seen through, and graduations spaced along the wall of the tube enable comparison of tool-imparted impact values of different tools on operations of different impact-producing elements of a single tool.

4. The instrument according to claim 2, wherein the abutment is supported on a lever rigid with the torsion bar and projecting transversely of its axis, and a tappet which is spring biased into contact with a free end portion of the lever normally supports the ball in arrested position.

5. The instrument according to claim 4, wherein the biasing spring of the tappet is disposed between a portion of the guide and an abutment which is adjustable axially on the tappet, whereby the spring can absorb variable proportions of impact forces applied to the tappet.

6. The instrument according to claim 1 wherin a bearing operatively integral with the first mentioned torsion bar supporting means holds the free end portion of the torsion bar for angular movement about a fixed axis.

7. The method of comparing output or delivery impacts of rotary impact tools, comprising torque-connecting the tools to an angularly movable end portion of a torsion bar which is fast at its opposite end, and causing an intermediate portion of the torsion bar to jolt a projectile along a guide distances approximately proportional to the impact delivered to the torsion bar by the tools.

References Cited in the file of this patent
UNITED STATES PATENTS
2,885,884    Nelson _____ May 12, 1959